United States Patent
Cooklev et al.

(10) Patent No.: US 6,560,331 B1
(45) Date of Patent: May 6, 2003

(54) SYSTEM AND METHOD FOR PRECISE DTMF SIGNAL DETECTION

(75) Inventors: Todor Cooklev, Salt Lake City, UT (US); Mark Gray, Salt Lake City, UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/407,829

(22) Filed: Sep. 28, 1999

(51) Int. Cl.[7] .................... H04M 3/00; H04M 5/00; H04M 1/00
(52) U.S. Cl. ........................... 379/283; 379/386
(58) Field of Search .................... 379/282, 283, 379/386, 339, 378, 379; 370/526; 375/328; 708/312

(56) References Cited

U.S. PATENT DOCUMENTS

| | | | |
|---|---|---|---|
| 4,860,340 A | 8/1989 | Suzuki | 379/74 |
| 4,868,872 A | 9/1989 | Roberts et al. | 379/386 |
| 4,979,214 A | 12/1990 | Hamilton | 704/233 |
| 5,119,322 A * | 6/1992 | Stroobach | 708/312 |
| 5,172,406 A | 12/1992 | Locke | 379/88.27 |
| 5,392,348 A * | 2/1995 | Park et al. | 370/526 |
| 5,428,680 A | 6/1995 | Murata et al. | 379/386 |
| 5,459,785 A | 10/1995 | Noda | 379/386 |
| 5,535,271 A | 7/1996 | Jangi et al. | 379/351 |
| 5,633,862 A | 5/1997 | Suzuki et al. | 370/280 |
| 5,644,633 A | 7/1997 | Kaufeld et al. | 379/357.05 |
| 5,644,634 A * | 7/1997 | Xie et al. | 379/382 |
| 5,699,421 A | 12/1997 | Nirshberg et al. | 379/386 |
| 5,809,133 A * | 9/1998 | Bartkowiak et al. | 379/282 |
| 6,229,889 B1 * | 5/2001 | Cannon et al. | 375/328 |

OTHER PUBLICATIONS

Efficient Dual–Tone Multifrequency Detection Using the Nonuniform Discrete Fourier Transform *IEEE Signal Processing Letters*, vol. 5, No. 7, Felder et al., Jul. 1998.

The Nonuniform Discrete Fourier Transform and Its Applications in Filter Design *IEEE Transactions o circuits and Systems—II: Analog and Digital Signal Processing*, vol. 43, No. 6, Bagchi, Jun. 1996.

* cited by examiner

*Primary Examiner*—Benny Q. Tieu
(74) *Attorney, Agent, or Firm*—Workman, Nydegger & Seeley

(57) ABSTRACT

A method and system for facilitating the detection of DTMF tones is disclosed. The method is based on detecting two tones using a modified nonuniform discrete Fourier transform that includes a phase correction term for each DTMF tone and harmonic. The disclosed method is employed by a DTMF detector that includes a sampling module, a computation module, an analysis module, and a decode module. The sampling module samples an input signal from a communication network at a rate sufficient to avoid data loss. The sample signal is then placed through a modified DFT which is more precise than filters or analog devices, particularly those utilizing a Goertzel algorithm. The computation module implements a fast recursive algorithm for completing the necessary computations. The analysis module checks for the present of energy level peaks at the DTMF tones and their harmonics. Once a DTMF signal is verified to contain a DTMF tone, the decode module transmits the,number, letter, or symbol to an interface.

10 Claims, 5 Drawing Sheets

SYSTEM AND METHOD FOR PRECISE DTMF SIGNAL DETECTION

BACKGROUND OF THE INVENTION

1. The Field of the Invention

The field of the invention relates to communications over telephone lines using dual-tone multiple frequency (DTMF) signaling. Specifically, the invention relates to the detection of DTMF signaling by a modem using a DTMF decoder that applies a non-uniform sample index by including compensation for the phase error introduced by the ITU standards, thereby reducing signal leakage.

2. Prior State of the Art

Dual-tone multiple frequency (DTMF) signaling, increasingly being deployed worldwide with push-button telephone sets, offers a high dialing speed compared with the dial-pulse signaling used in conventional rotary telephone sets. DTMF signaling is also used in applications requiring interactive control such as in voice mail, phone messaging, e-mail, telephone dialing, voice mail, and telephonic banking systems. In addition to signaling, tone detection is also used in line probing techniques to estimate the quality of phone lines. The DTMF signal standard, initially developed by Bellcore, was redefined in 1989 by the International Telecommunication Union (ITU). Since the Bellcore DTMF standard is a subset of the ITU standard, an ITU-compliant DTMF device must also be Bellcore compliant. To be commercially viable, all modems presently offered for sale must include DTMF signaling generation and detection functionality.

A DTMF signal consists of a sum of two tones with frequencies taken from two mutually exclusive groups of preassigned frequencies. Although alternative frequencies may be detected using the same methods employed by DTMF detectors, modern applications are optimized for detecting the frequencies of two tones from the internationally accepted ITU standard frequencies. The mutually exclusive groups of preassigned ITU frequencies consist of four low frequency tones and four high frequency tones. The four low frequency tones are 697 Hz, 770 Hz, 852 Hz, and 941 Hz. The four high frequency tones are 1,209 Hz, 1,336 Hz, 1,477 Hz, and 1,633 Hz. Each pair of tones, consisting of a low frequency tone and a high frequency tone, correspond to a unique number or symbol, one of sixteen push-button digits (0–9, A–D, #, *). The four alphanumeric keys (A–D) are not yet available on standard telephone handsets and are reserved for future use. Since the DTMF signaling frequencies are all located in the frequency band used for speech transmission, DTMF signaling systems are considered in-band.

The digital generation of DTMF signals is accomplished by adding two finite duration digital sinusoidal sequences. Table 1 demonstrates how the four low frequency tones and four high frequency tones are combined in a DTMF signal to create sixteen touch-tone digits consisting of numbers, symbols, and letters.

TABLE 1

| Low f (Hz) | High f (Hz) | | | |
|---|---|---|---|---|
|  | 1209 | 1336 | 1477 | 1633 |
| 697 | 1 | 2 | 3 | A (ASCII 65) |
| 770 | 4 | 5 | 6 | B (ASCII 66) |
| 852 | 7 | 8 | 9 | C (ASCII 67) |
| 941 | * | 0 | # | D (ASCII 68) |

To be commercially viable, DTMF decoders are subject to the constraints created by the ITU recommendations concerning frequency resolution, time duration, and signal power. Under the ITU recommendations a detected frequency must be within 3.5% of the expected frequency or be rejected as a DTMF tone. The guidelines also require that a qualified detected frequency within 1.5% of the target frequency register as a DTMF tone. According to the ITU recommendations, a DTMF signal of less than 23 ms should be rejected, while a signal duration of 40 ms or more should be accepted. Signals between 23 ms and 40 ms can either be accepted or rejected. Signal strength is measured by a Signal-to-Noise ratio and signal power. A detected signal must have at least a 15 dB Signal-to-Noise ratio before it can be considered. The detected signal must also have a signal power of at least −26 dBm. The ITU recommendations are shown in table 2 below.

TABLE 2

| ITU Recommendations | | | |
|---|---|---|---|
| Signal Frequencies | low group | 697, 770, 852, 941 Hz | |
|  | high group | 1209, 1336, 1477, 1633 HZ | |
| Frequency Tolerance | operation | ≦1.5% of signal frequencies | |
|  | non-operation | ≧3.5% of signal frequencies | |
| Signal Duration | operation | 40 ms | minimum |
|  | non-operation | 23 ms | maximum |
| Signal Exception | pause | 40 ms | maximum |
|  | interruption | 10 ms | minimum |
| Twist | forward | 8 dB | |
|  | reverse | 4 dB | |
| Signal Strength | S/N | 15 dB | minimum |
|  | power | −26 dBm | minimum |

These ITU recommendations place stringent constraints on DTMF detection performance in both the time and frequency domains and are not always satisfied by conventional DTMF decoders relying on a standard DFT.

Decoding a DTMF signal involves identifying two tones in the sampled signal and distinguishing the two tones from signal noise, human voice signals, and other signal interference. Although a number of chips with analog circuitry are available for the generation and detection of DTMF signals in a single channel, these function can also be implemented digitally on DSP chips. The digital implementations surpass analog approaches both in cost and performance. The digital DSP based tone detection can be performed by computing the discrete Fourier transform (DFT) of the DTMF signal and then measuring the energy present at the eight fundamental DTMF tones and the eight associated second harmonic frequencies. The second harmonic energy measurement is made to distinguish DTMF signals from human voices. In general, the spectrumn of the human voice contains energy components at the second harmonics, while the DTMF contains negligible energy at the second harmonics. Thus, if energy is present at both the DTMF fundamental tone and the second harmonic then the signal is probably not a DTMF signal.

A traditional DTMF decoder computes the DFT samples closest in frequency to the eight fundamental frequencies in the ITU standard for DTMF. Most of the approaches in the prior art are based on the DFT of equation 1.

$$X(k) = \sum_{n=0}^{N-1} x(n) e^{-j2\pi kn/N} \quad (1)$$

Given a sequence of N samples, the DFT uniformly samples the discrete-time Fourier transform of the sequence at N evenly spaced frequencies, $$\omega = 2\pi \frac{k}{N}$$

where k, the frequency bin index, is equal to 0, . . . , N-1. Making the width (resolution) of each frequency bin equal to $2\pi/N$. Each frequency bin is centered at an integer multiple of $2\pi/N$, these uniform blocks do not correspond exactly to the eight fundamental DTMF frequencies, nor do they correspond to the eight associated second harmonic frequencies. This means no single value of N can meet all of the ITU frequency resolution recommendations. AT&T states that N=205 is the best value of N at a 8000 Hz sampling rate to detect the eight fundamental DTMF tones. A common method used to detect DTMF signaling assumes that the DTMF decoder does not need all samples X(k), since only eight frequencies are initially relevant. Since only a small subset of samples is required a fast Fourier Transform (FFT) algorithm is not efficient to use for DTMF detection. It is well known to those skilled in the art that Goertzel's algorithm is a more efficient and effective algorithm when only a small subset (8 fundamental tones and 8 harmonic tones) of samples X(k) are required. Numerous DTMF decoders in the prior art are based on using a DFT employing Goertzel's algorithm. In one previous embodiment the DTMF decoder used two banks of eight filters, one bank using Goertzel's algorithm for the fundamental tones and the other bank for the harmonics. This enables the device to avoid computing all N DFT coefficients for each fundamental DTMF frequency. The Goertzel filter is typically implemented as a second order infinite impulse response (IIR) band pass filter. The Goertzel filter requires 2N real multiplication/addition operations by the DSP. Other implementations employ the use of a non-uniform DFT (NDFT) to detect energy at fundamental DTMF frequencies. By setting k to yield an exact DTMF frequency of interest, i.e. $k=N f_i/f_s$ where $f_s$ is the sampling rate. This approach in effect creates sliding windows for the DFT bin that adds considerable complexity to the DSP calculations and still results in non-exact calculations.

Unfortunately, even the DTMF decoders using a DFT that employs Goertzel's algorithm have fundamental disadvantages that prevent exact detection of the fundamental DTMF tones. The DFT length N determines the frequency spacing between the locations of the DFT samples. The DFT frequency bin index k is defined in equation 2.

$$k = f_k \frac{N}{f_s} \quad (2)$$

Since k is an integer, only certain frequencies ($f_k$) can be represented at any given sampling frequency ($f_s$) as seen in equation 3.

$$f_k = k \frac{f_s}{N} \quad (3)$$

Furthermore, $f_k$ is periodic in N data samples such that there are k full cycles of frequency $f_k$ in the N samples. If the input signal sampled contains a sinusoid of frequency f different from the set of frequencies represented by equation 3, then the DFT will contain large valued samples at values of k closest to $Nf/f_s$. In addition, however, the DFT will contain non-zero values at other values of k due to a phenomenon called leakage. To minimize leakage it is desirable to choose N appropriately so that the tone frequencies fall as closely as possible to a DFT bin, thus providing a relatively strong DFT sample at this bin. The DTMF decoder computes the DFT samples closest in frequency to the eight DTMF fundamental tones. as previously mentioned, for a sampling frequency of 8,000 Hz, AT&T has found that N=205 is the best value to detect the eight fundamental DTMF tones. In contrast, N=201 is the best value to detect the eight second harmonic frequencies. Table 3 shows that the DFT index values closest to each of the tone frequencies and their second harmonics for these values of N.

TABLE 3

Fundamental Tones

| BASIC TONE (HZ) | EXACT k VALUE | CLOSEST INTEGER | ABSOLUTE ERROR (Δk) |
|---|---|---|---|
| 697 | 17.861 | 18 | 0.139 |
| 770 | 19.731 | 20 | 0.269 |
| 852 | 21.833 | 22 | 0.167 |
| 941 | 24.113 | 24 | 0.113 |
| 1209 | 30.981 | 31 | 0.019 |
| 1336 | 34.235 | 34 | 0.235 |
| 1477 | 37.848 | 38 | 0.152 |
| 1633 | 41.846 | 42 | 0.154 |

Harmonic Tones

| SECOND HARMONIC (Hz) | EXACT k VALUE | CLOSEST INTEGER | ABSOLUTE ERROR (Δk) |
|---|---|---|---|
| 1394 | 35.024 | 35 | 0.024 |
| 1540 | 38.692 | 39 | 0.308 |
| 1704 | 42.813 | 43 | 0.187 |
| 1882 | 47.285 | 47 | 0.285 |
| 2418 | 60.752 | 61 | 0.248 |
| 2672 | 67.134 | 67 | 0.134 |
| 2954 | 74.219 | 74 | 0.219 |
| 3266 | 82.058 | 82 | 0.058 |

It is clear that any approach based on the DFT cannot satisfy the ITU recommendations exactly. The fundamental reason for this failure is that k must be an integer, but if a DTMF decoder is limited to selecting integer values for k then each calculation introduces an absolute error to the DFT of the sample.

SUMMARY AND OBJECTS OF THE INVENTION

It is therefore an object of the present invention to provide a method of detecting DTMF tones through a fast recursive modified DFT that includes a phase correction term.

It is yet a further object of the present invention to provide a system for efficiently detecting DTMF signals received from a communications network, (e.g., a telephone network), for decoding the DTMF signals via a terminal or network interface device, (e.g., a modem), that utilizes a recursive modified DFT to introduce a phase error compensation factor into the DSP computations.

It is another object of the present invention to provide a DTMF decoder for incorporation into a network interface device, such as a modem, that is compatible with the ITU recommendations.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a DTMF signal transceiver circuit apparatus for improving upon the architecture, detection, extraction, decoding, and transmission functionality with respect to dual-tone modulated frequencies of a terminal equipment device, such as a modem, is presented. The DTMF signal transceiver circuit apparatus is deployed in digital devices wherein accuracy is critical. The DTMF signal transceiver circuit apparatus includes a circuit capable of generating and detecting DTMF tones that must be interpreted by the terminal equipment, such as a modem, in order to comply with specifications propagated by the ITU.

The circuit of the present invention, in its preferred embodiment, is comprised of a communication network interface; a DTMF generator module for generating the fundamental DTMF tones and summing them together; a DTMF detector comprising a sampling module, a computation module, an analysis module, and a decode module; and a terminal device interface. The sampling module is adjusted to a frequency adequate to avoid data loss, typically twice the frequency of the largest valid transmitted value. The computation module of the present invention provides a technical advance by compensating for the phase error introduced into all calculations based on a DFT or non-uniform DFT during the processing of the signals. More specifically, a correction term is determined and added to the DFT, creating a modified DFT. As the computation module is no longer using a uniform DFT, typical FFT based processor operation reductions are not available to the computation module, instead the present invention develops a fast algorithm to compute the proposed transformation. Once the modified DFT is completed the computation module calculates the energy levels at the relevant energy peaks coinciding with the fundamental DTMF tones and their respective second harmonic frequencies. The analysis module takes the results of the DFT transform and the energy level calculation to determine whether a DTMF tone has been observed. The circuit assumes that a DTMF tone has been detected when an signal energy peak is detected within the ITU signal tolerance range of a low fundamental DTMF frequency and a high fundamental DTMF frequency, and there are no energy peaks found at the corresponding harmonics. The analysis module must also verify that the signal meet the corresponding ITU requirements for signal strength and duration. Once a DTMF signal has been confirmed the decode module, takes the two fundamental frequencies and translates them into the number, symbol, or letter corresponding to the detected frequencies. This translated value is then passed to the terminal device interface for further use by the modem.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
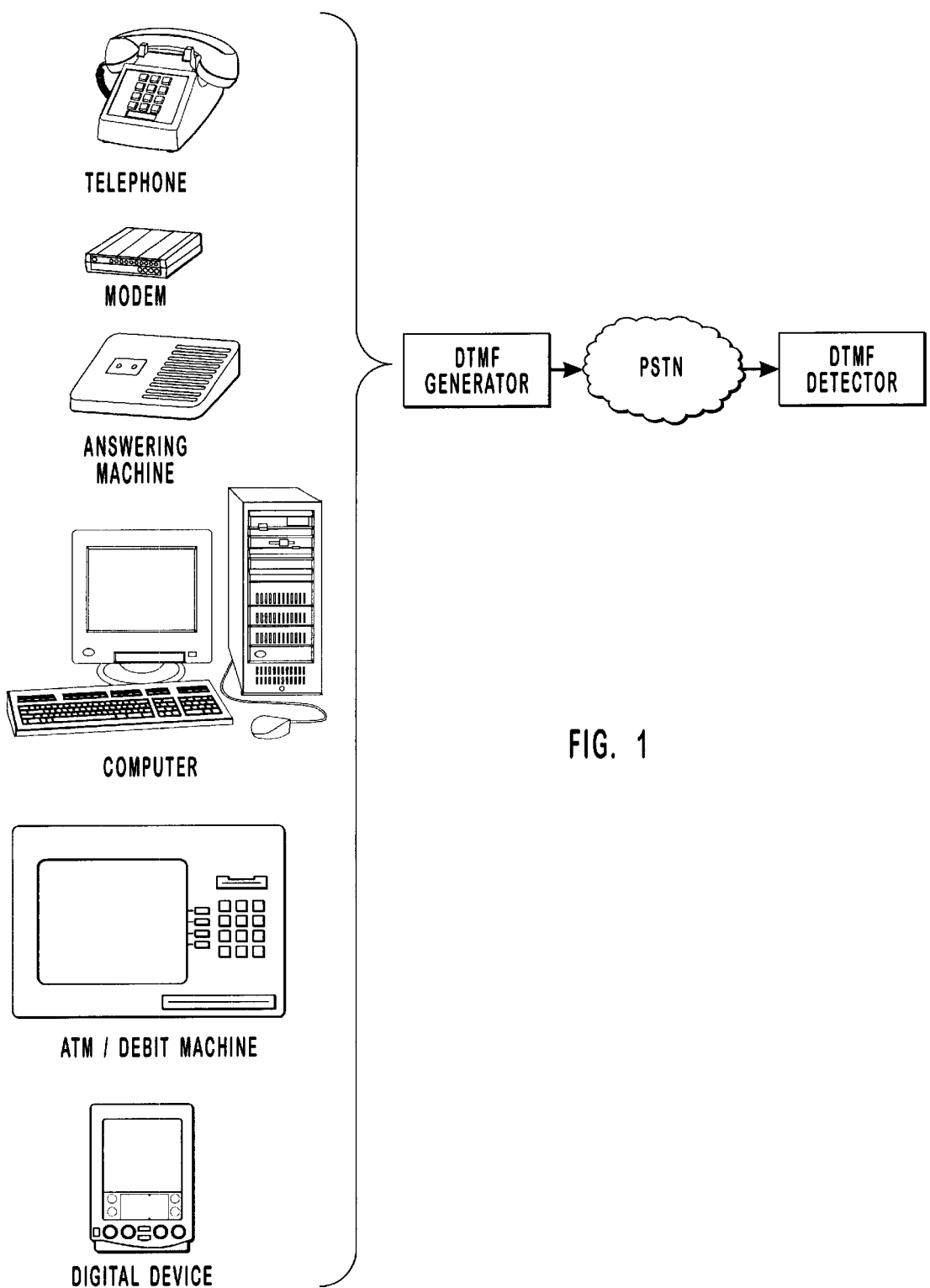
FIG. 1 is a block diagram of a DTMF generation and detection system.

The present invention is drawn to a DTMF signal transceiver circuit comprising control circuitry, a DTMF generator, and a DTMF detector which may be employed or incorporated into a terminal equipment device, such as a modem, for interfacing with a telephone network. As describe above, telephone networks impose specific stringent ITU standards upon terminal equipment concerning the generation and detection of DTMF tones. In the preferred embodiment of the invention, a DTMF signal transceiver circuit complying with the telephone network ITU specifications concerning DTMF signaling is used to create and decode DTMF signals received across the attached communications network. For example, one ITU standard requires that a DTMF signal have a signal duration of at least 23 ms and preferably be maintained for 40 ms. Many DTMF decoders improperly reject valid signals because the "window" for the signal sample is too large reducing the overall resolution of the DFT being performed on the sampled signals. The present invention provides several methods by which the DTMF signal may be detected by increasing the resolution without introducing phase error into the signal results, thereby awarding the false detection of phantom tones while validating proper DTMF signals.

The circuit of the present invention, in its preferred embodiment, is comprised of a communication network interface; a DTMF generator module for generating the fundamental DTMF tones and summing them together; a DTMF detector comprising a sampling module, a computation module, an analysis module, and a decode module; and a terminal device interface. The sampling module is adjusted to a frequency adequate to avoid data loss, typically at least twice the frequency of the largest valid transmitted value. Generally, this sampling rate is 8,000 Hz, but 7,200 Hz would also be acceptable. The computation module of the present invention provides a technical advance by compensating for the phase error introduced into all calculations based on a DFT or non-uniform DFT during the processing of the signals. More specifically, a correction term is determined and added to the DFT, creating a modified DFT. As the computation module is no longer using a uniform DFT, typical FFT based processor operation reductions are not available to the computation module, instead the present invention develops a fast algorithm to compute the proposed transformation for the fixed relevant frequencies. Once the modified DFT is completed the computation module calculates the energy levels at the relevant energy peaks coinciding with the fundamental DTMF tones and their respective second harmonic frequencies. The analysis module takes the results of the DFT transform and the energy level calculation to determine whether a DTMF tone has been observed. In the preferred embodiment, the method assumes that a DTMF tone has been detected when an signal energy peak is detected within the ITU signal tolerance range of a low fundamental DTMF frequency and a high fundamental DTMF frequency, and there are no other energy peaks found at the fumndamental tones or at the harmonics corresponding to the detected frequencies. The analysis module must also verify that the signal met the corresponding ITU requirements for signal strength and duration. Once a DTMF signal has been validated the decode module, takes the two fundamental frequencies and translates them into the number, symbol, or letter corresponding to the detected frequencies. This translated value is then passed to the terminal device interface for further use by the modem, or attached digital device.

The preferred embodiment rejects requirements of standard DTMF decoders, specifically resolution limitations and the reliance on DFT index values that introduce phase error into the DFT computation. The DFT length N determines the frequency spacing between the locations of the DFT samples. A large N makes the space smaller, providing higher resolution in the frequency domain. However, it decreases the resolution in the time domain and increases computation time. The frequency $f_k$ in Hz corresponding to the DFT index or bin number k is:

$$f_k = k\frac{f_s}{N}.$$

For example, consider the detection of the sinusoid of frequency $f_1=697$ Hz. Suppose the sampling frequency $f_s$, is 8,000 Hz. With these constants there is no value of N, for which subvalue of the bin k would correspond to 697 Hz. Experimental research has found that N=205 is the best choice for DTMF frequencies and that N=201 is the best choice for DTMF harmonic frequencies, but it is still not precise. Bin 17.861 would correspond to 697 Hz, but since the bin in a uniform DFT must be an integer we must take k=18, thereby introducing a phase error of 0.139. This can be a serious error, as the DFT will contain large values not only at k=18 but at neighboring bins as well. The phenomenon of introducing a phase error is called leakage. Thus, all techniques for DTMF detection, known in the prior art, based on the DFT are imprecise to some extent. The bin number as previously defined is:

$$k = \frac{f_k N}{f_s}$$

The ITU has chosen the DTMF frequencies in such a way that whatever N and $f_s$ are chosen (assuming even that we can freely chose $f_s$), k will never be an exact integer. If DFT is used, leakage will always be present and therefore the ITU specifications can never be satisfied exactly. Table 3 demonstrates the introduction of this absolute error into the signal analysis. Occasionally errors will happen due the this leakage, but the number of these errors can be minimized. If these errors are left at a certain threshold, the communications equipment satisfies the Bellcore specification and is commercially viable for sales in the United States and Canada. For example, as indicated in an article by S. Gay, J. Hartung, and G. Smith, entitled, "Algorithms for Multichanneled DTMF Detection for the WE-DSP32 Family," IEEE ICASSP, 1989, pp. 1134–1137, five false detections during 30 minute sampling of speech is a good level of performance.

A more careful analysis would reveal that non-integer values of k would lead to another error as well. The phase of the DFT will not be correct in real time signal analysis, which affects the ITU-T specifications in the time domain. For example, suppose that k is a non-integer:

$$k=[k]+\Delta k \quad (4)$$

where [k] is the integer part and $\Delta k<1$ is the remainder. Therefore, when k is not an integer we have $$X(k) = \sum_{n=0}^{N-1} x(n)e^{-j2\pi n([k]-\Delta k)/N} \quad (5)$$

Compared to the approaches known in the prior art which are based on equation 6.

$$X(k) = \sum_{n=0}^{N-1} x(n)e^{-j2\pi n[k]} \quad (6)$$

The known equations in the prior ignore the phase correction term $e^{-j\pi m\Delta k/N}$ Now, when the DFT is calculated from the next N samples there is a $2\pi\Delta K$ radian phase error. This phase error accumulates for every block of N input samples, even if the DFT is not calculated for this block of N samples. The cumulative phase error is a phase advance, since by definition $\Delta K$ is always positive and for the m-th block of N samples, the phase advance is $2\pi m\Delta K$. To overcome these disadvantages, the preferred embodiment implements the following modified DFT:

$$X_m(f) = e^{m\Delta k 2\pi} \sum_n x[n]e^{-j2\pi n\frac{f}{f_s}} \quad (7)$$

Note that we used [.] for discrete variables and (.) for continuous variables. In the above definitions, f can be any frequency, in particular it can be exactly any of the DTMF frequencies. The phase in the first term can be taken modulo $2\pi$, and m is the block number.

Any modification of the DFT is of little merit if there is no efficient way to compute it. A fast recursive algorithm to compute the modified DFT is necessary, as an FFT algorithm cannot be used for the above modification, since they cannot be modified accordingly. The modification of the DFT is of practical significance, because there is a fast recursive algorithm that can be used for its computation. Assuming that at instant n the window comprises the N values x(n−N+1), x(n−N+2), . . . , x(n−1), x(n). Then we can write the proposed DFT with phase correction as a scalar product.

$$X_{n,m}(f) = \vec{X} \cdot \vec{\theta} \quad (8)$$

where the vectors are described by equations 9 and 10:

$$\vec{X} = [x[n-N+1]x[n-N+2]\ldots x[n-1]x[n]] \quad (9)$$

$$\vec{\theta} = [e^{-j\theta_2}e^{-j(\theta_1-\theta_2)}\ldots e^{-j((N-2)\theta_1-\theta_2)}e^{-j((N-1)\theta_1-\theta_2)}] \quad (10)$$

where $\theta_1$ and $\theta_2$ correspond to equations 11 and 12.

$$\theta_1 = \frac{2\pi f}{f_s} \quad (11)$$

$$\theta_2 = 2\pi\Delta\left(\frac{fmN}{f_s}\right) \quad (12)$$

The function $\Delta(x)$ is equal to x minus the integer portion of x. Clearly the spectrum $X_{n,m}(f)$ function of the time index n, the number block m, and the frequency of interest f. We have also equation 13.

$$X_{n-1,m}(f) + \vec{X}[n-1]\cdot\vec{\theta} \quad (13)$$

Now we can express $X_{n,m}(f)$ in terms of $X_{n-1}$, m(f):

$$X_{n,m}(f) = [X_{n-1,m}(f) - x(n-N)e^{-j\theta_2}]e^{j\theta_1} + x(n)e^{-j(N-1)\theta_1 - \theta_2} \quad (14)$$

Thus taking advantage of the shifting window contents, a recursive expression for the DFT can be obtained with O(N) complexity, as demonstrated equation 15.

$$X_{n,m}(f) = \{X_{n-1,m}(f) + [x(n) - x(n-N)e^{-jN\theta_1}]e^{-j\theta_2}\}e^{j\theta_1} \quad (15)$$

Ultimately, an efficient algorithm to compute the proposed non-uniform DFT with phase correction is obtained, particularly when only a few samples of the signal spectrum are required.

In conclusion, a modified definition of the DFT has been created. This modified DFT is especially suited for DTMF detection. However, it can be used in other applications, where accurate detection of tones is necessary. Furthermore, a new algorithm for computation of this modified DFT has been developed. This new algorithm is a further improvement over the algorithm provided in equation 2, where only the standard DFT was considered. The new algorithm is also an improvement over equation 1, because the absolute phase error is avoided.

In a recent publication this problem was overcome with the use of generalized or non-uniform DFT. See "Efficient Dual-tone Multiple frequency Detection Using the Nonuniform DFT" in "IEEE Signal Processing Letters," Vol. 5, No. 7, 1998, by M. Felder et al., which is also a U.S. patent application. Because the non-uniform DFT, in fact, accepts non-integer values of k, this approach has the potential to detect tones exactly. However, there are two problems with this method. The first problem is algorithmic, because k is a non-integer, the many vast algorithms in the prior art cannot be used directly. An efficient algorithm to compute the non uniform DFT is not known. The second problem appears as a result of the processing of data in blocks. There are k full cycles of frequency $f_f$ in the end samples. When k is not an integer there will be a phase error that will accumulate with every block of N samples. It is the purpose of the present invention to overcome these disadvantages. In particular, the preferred embodiment discloses a generalization of the DFT which takes the phase error into consideration. The preferred embodiment of the present invention also develops a fast algorithm to compute the proposed transformation.

FIG. 1 is an overview illustrating various networks that might use or generate a dual-tone modulated frequency (DTMF) signal. There are many devices which presently utilized DTMF signals. For example, a touch tone telephone 102, modem 104, answering machine 106, computer 108, ATM/Debit machine 110, and other various digital devices 112. These devices utilize the DTMF signals to enable a communication line, to identify a particular activity, or to authorize access to date. Once the signal has been transmitted to the DTMF generator 114, the encoded signal is transmitted across the PSTN 116 or other communication networks. The DTMF detector 118 receives the signal that was originally generated along with noise that may have been added to the signal during the transmission. As a result of the added noise, the detection portion of the process is often the most complicated. Furthermore, the ITU recommendations established for analyzing a DTMF signal further complicate the detection process by restricting the type of signals that may be accepted.

Figure 2:
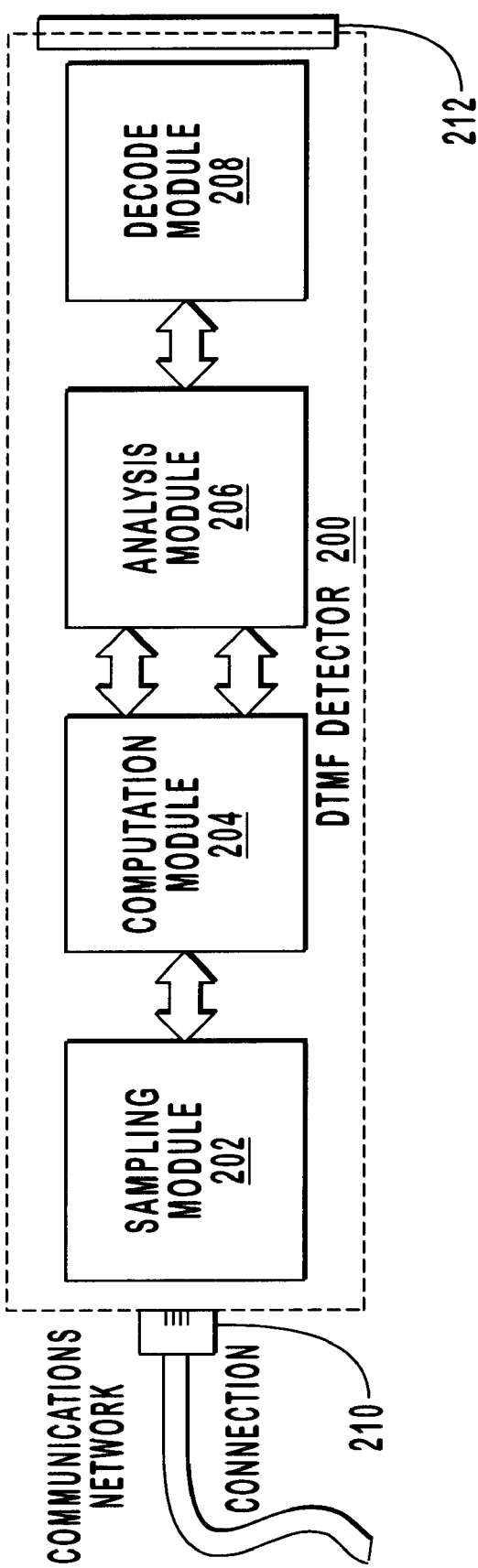
FIG. 2 is a block diagram of a DTMF detector.

FIG. 2 represents a block diagram of a DTMF detector 200. The DTMF detector 200 is attached through an interface with a communication network connection 210 and a computer or digital interface 212. The communication network connection 210 attached either from a local area network or from a PSTN 116. The digital interface 212 attaches to a controlling body such as a computer, an answering machine, a modem, a telephone, an ATM Debit machine, or other digital device requiring DTMF detection. The DTMF detector consists of four primary modules. The sampling module 202, the computation module 204, the analysis module 206, and the decode module 208. The sampling module 202 obtains a signal sample from the network connection. The sampling frequency is preferably at least twice the largest signal to be detected, thus sampling above 7,200 Hz will generally have satisfactory results. The size of this sample is determined by the system at a preset level generally depicted as being N. Standard systems generally choose a size of approximately 205, while the DTMF second harmonics are best found using an N value of 201, but as the preferred embodiment of this invention automatically compensates for a phase error, the preferred N value is 245. The maximum accepted value of N for a 40 millisecond sample with a sampling frequency of 8,000 Hz would be a value of 320 for N. Once the signal has been sampled in this fashion, the data is sent to computation module 204. The computation module will increment the slice counter and compute the phase correction term using the new slice counter value to account for the variance from the actual value. This computation module also takes into account the symmetries of the various trigometric functions and utilizes the modified DFT provided in this section of the application. The computation module performs an N point modified DFT using the most recent N samples to compute the sixteen output values corresponding to the eight DTMF frequencies and their respective eight harmonics. The computation is performed using the recursive formula outlined previously in the text. Once these values have been computed, the next computation step involves the calculation of the energy of each component for these two sets of eight output frequencies. Once the DFT values and the energy values are computed, this information is transferred to the analysis module 206. In the analysis module, these values are evaluated such that if the energy in just one of the four lower frequencies and one of the four higher frequencies is above a threshold and the energy present in the second harmonics of these frequencies is below a threshold, then a DTMF signal is present and the digit letter or symbol is decoded. If these values are satisfied, then the information is sent to the decoder module that determines which digit, letter, or symbol has been sent using the deferred DTMF signal. Finally, the decode module encodes this value into a digital value to be transmitted across the interface 212.

Figure 3:
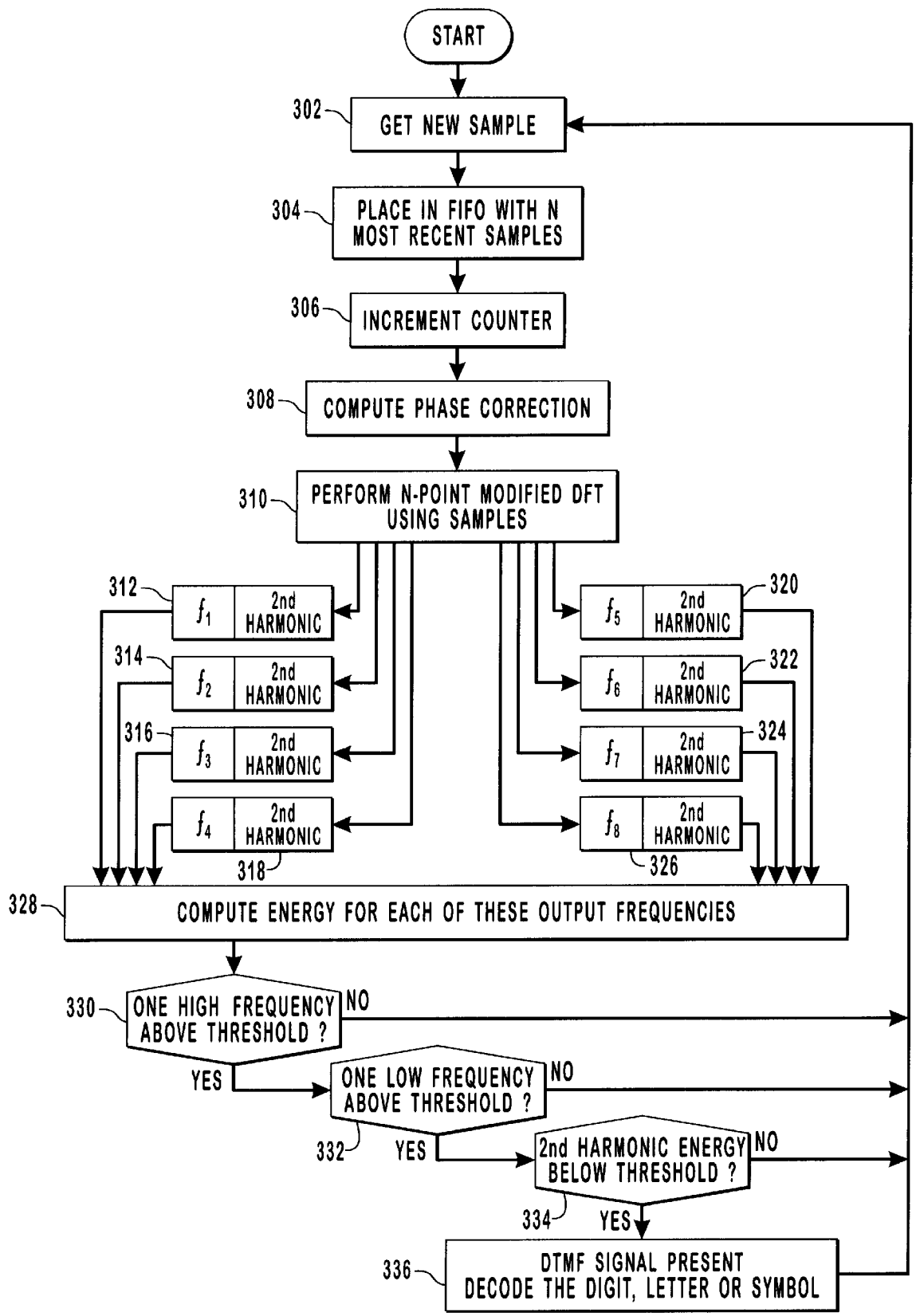
FIG. 3 is a flow diagram of the DTMF detection process.

FIG. 3 is a flow chart depicting one method of detecting and decoding a DTMF signal using the modified DFT. Execution block 302 obtains a new sample from the input signal from the communications network. Execution block 304 places this new sample into a first in first out FIFO with the N most recent samples where N represents the resolution of the samples. Execution block 306 increments the counter block variable in the equation 15 by one. Execution block 308 computes the phase correction term using the new counter block value, taking into account simplifications due to the symmetries of the trigonometric functions. Execution block 310 performs an N point modified DFT using the most recent N samples; computing only the sixteen output values corresponding to the eight DTMF frequencies and the eight DTMF second harmonic frequencies. This computation is performed using the recursive formula outlined in equation 15. Execution block 312 checks for the presence of low DTMF frequency, 697 Hz, and the second harmonic. Execution block 314 checks for 770 Hz and its second harmonic. Execution block 316 checks frequency 852 Hz and its second harmonic. Execution block 318 detects 941 Hz and its second harmonic. Execution block 320 detects the first high DTMF frequency 1,209 Hz plus its second harmonic. Execution block 322 checks for 1,336 Hz and its second harmonic. Execution block 324 detects 1,477 Hz and its second harmonic. Execution block 326 checks frequency 1,633 Hz and its second harmonic. In execution block 328, the energy level detected for each detected DTMF frequency and the respective DTMF second harmonic frequency is calculated. If the energy level detected is limited to two DTMF tones, one low and one high, both being eight lower frequencies are above a pre-set threshold level and the energy level of the DTMF second harmonic for these frequencies is below a threshold, then a DTMF signal is present and the digit or symbol should be decoded. Decision block 330 tests to see if there is one high frequency above the preset threshold level. If there is not, then it returns to block 302 to obtain a new sample. If there is only one high frequency, then decision block 332 looks to see if there is also only one low frequency above the threshold level. If there are numerous low frequencies above the threshold level or there are no frequencies above the threshold level, then the data stream returns to execution block 302 to obtain a new sample. If there is one low frequency detected in decision block 332, then the second harmonic energy level for the two detected DTMF tones is checked to determine whether it is below the threshold level. If the harmonics are not below the threshold level, then the signal is assumed to be voice communication and the data flow stream returns to execution block 302 to obtain a new sample. If the second harmonic energy level for the two detected frequencies is below the threshold level then decision block 334 feeds the detected signals into execution block 336, which indicates a DTMF signal is present. Execution block 336 decodes he signal into the digit, letter, or symbol. Following this detection and decoding process, execution block 336 feeds back into 302 to obtain a new sample.

Figure 4:
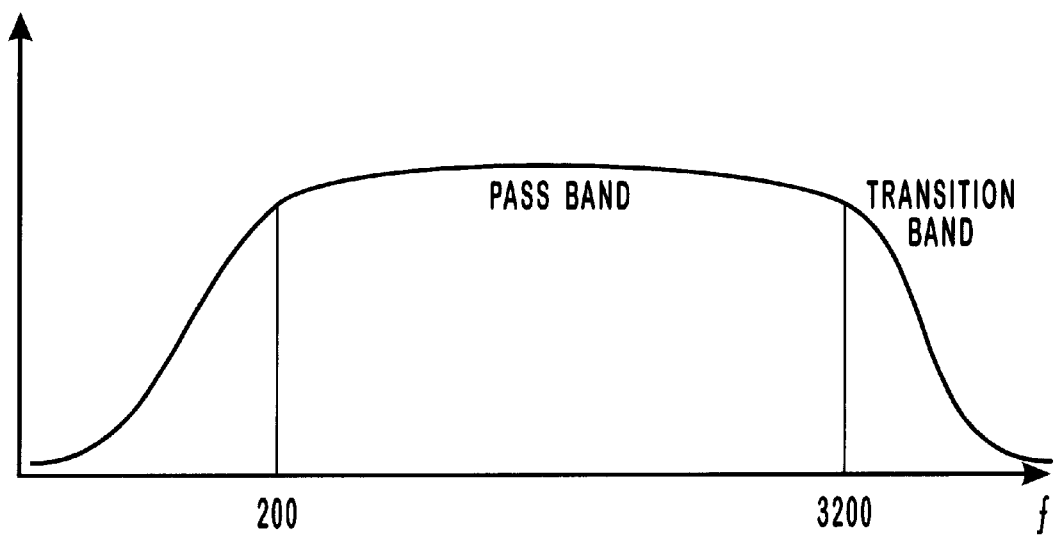
FIG. 4 is a frequency response diagram.

FIG. 4 represents a timeslice of the bandwidth of a sample signal taken from the communications network connection. The section in which the decoder is interested in signals in the pass band. In this example, the pass band is limited to frequencies between 200 Hz and 3,200 Hz. This bandwidth always the decoder to account for DTMF signals and DTMF second harmonics. The transition band may include some relevant harmonic information.

Figure 5:
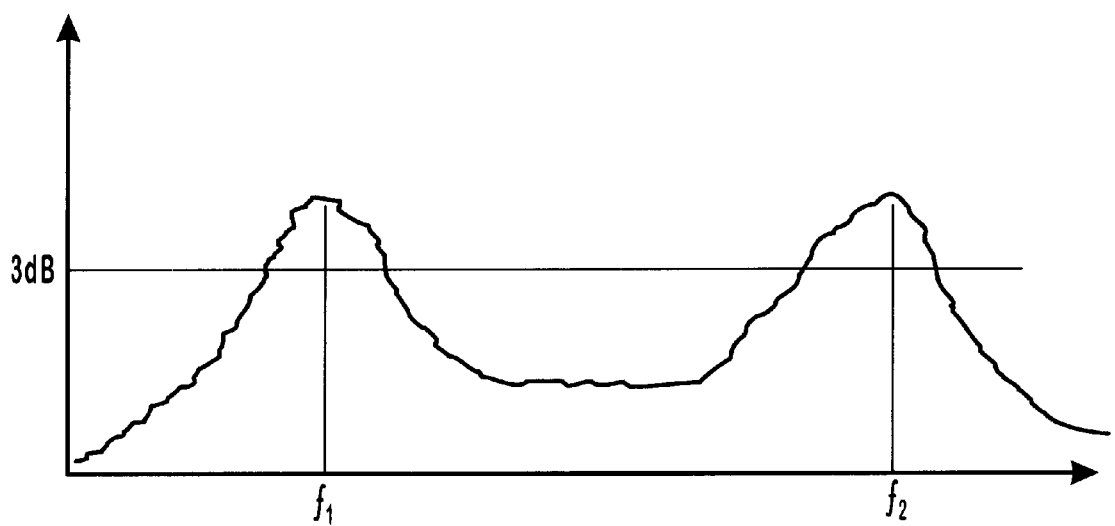
FIG. 5 is an energy peak analysis diagram.

FIG. 5 demonstrates an analysis module energy evaluation. In this graph, there are two energy peaks that rise above the preset 3 dB threshold. While this threshold might be 70% of the maximum energy peak or some other value established by the invention for this embodiment, 3 dB was selected. This guarantees that a majority of the noise will be filtered out increasing reliability. If there are more than one peaks above the threshold level then no DTMF signal is present. If the energy level peaks in FIG. 5 correspond with one of the four low DTMF tones and one of the four high DTMF tones then a DTMF signal will be detected, providing that there is no second harmonic or no energy above the threshold level at the second harmonic. The energy signal is not a smooth signal due to noise introduced during transmission of the DTMF signals.

Figure 6:
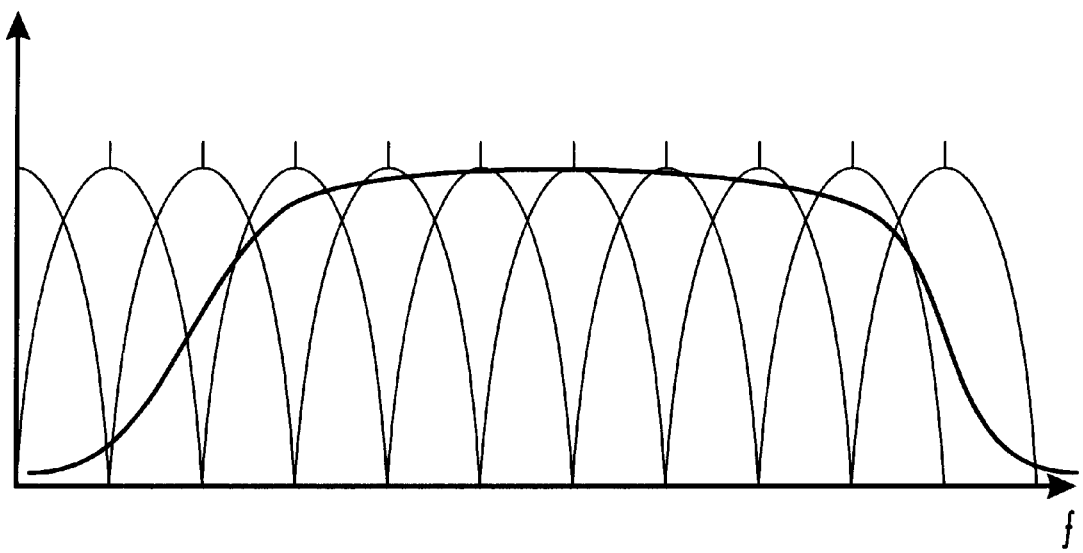
FIG. 6 is an uniform frequency sampling diagram.

FIG. 6 illustrates an uniform frequency sampling diagram. When utilizing a uniform sampling technique the decoder samples the signal at uniform intervals across the frequency spectrum. In the preferred embodiment, these samples are only taken over the frequency spectrum where signal information would be useful for detection by the device. In DTMF signal detection, this would be in the area previous described in FIG. 4. However, other bandwidth useful for in-line probing techniques to test the quality of lines may be used by some embodiments. While a majority of the DTMF detection methods presently use uniform sampling, they do not eliminate the absolute error introduced by using integers for the DFT index values. The embodiment of the present invention using uniform sampling, maintains many efficiency and accuracy advantages over prior DTMF detection methods, even in the uniform sampling mode, such as the addition of a phase correction term will still provide more accurate information about the signal at the sample frequency.

Figure 7:
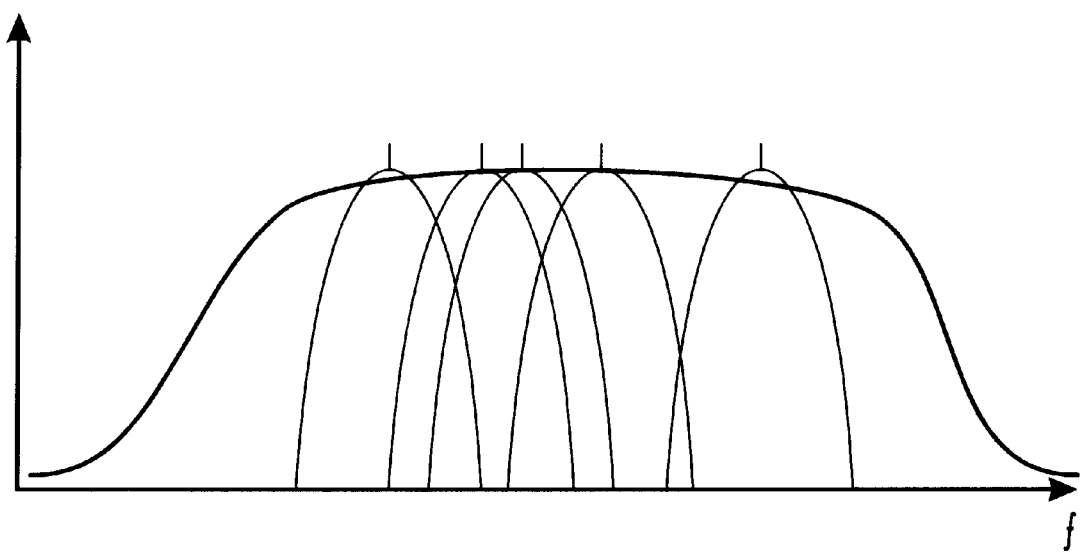
FIG. 7 is a non-uniform frequency specific sampling diagram.

FIG. 7 illustrates a non-uniform frequency specific sampling diagram. The preferred embodiment of the present invention utilizes a non-uniform sampling spectrum, sampling only the DTMF signals and the DTMF second harmonic frequencies. This allows the exact frequency to be selected for detection analysis by the decoder. The non-uniform selection of a frequency may result in a non-integer component of the DFT index value, requiring a phase correction component be included in the calculation. Using the improved recursive algorithm, the non-uniform sampling method drastically reduces the number of mathematical operations that must be performed by the DSP while concurrent increasing the accuracy by eliminating the absolute error traditionally introduced by uniform DFT methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a communication network, a method of detecting tones using a modified discrete Fourier transform (DFT) for dual-tone modulated frequency (DTMF) detection, said method comprising the steps of:

receiving a signal from across said communication network;

sampling the signal at a sampling frequency that is at least twice a maximum frequency in the signal;

sending the signal sample into a series of signal data blocks stored chronologically in a buffer;

recursively computing the modified DFT of the signal data blocks in the buffer, said modified DFT containing a phase correction component to reduce leakage from each signal data block;

measuring energy levels along a preset frequency spectrum;

upon detection of energy levels above a preset threshold level at a detected frequency, measuring the second harmonic energy levels associated with the detected frequency;

upon detection of energy levels above a preset threshold level at a primary frequency and energy levels at an associated second harmonic frequency below a preset secondary threshold, indicating the detection of a tone at the primary frequency.

2. The method as recited in claim 1, wherein the step of measuring energy levels along the preset frequency spectrum is limited to measuring the energy levels at DTMF frequencies and associated second harmonic frequencies.

3. The method as recited in claim 2, wherein the DTMF frequencies are the eight DTMF frequencies established by the ITU;

said eight DTMF frequencies consisting of four upper level and four lower level frequencies;

the four upper level frequencies being 1209 Hz, 1336 Hz, 1477 Hz, and 1633 Hz;

the four lower level frequencies being 697 Hz, 770 Hz, 852 Hz, and 941 Hz.

4. The method as recited in claim 3, further comprising the step of indicating the detection of a DTMF digit when corresponding upper level and lower level DTMF frequencies are detected in samples taken during a specified signal duration.

5. The method as recited in claim 1, further comprising the step of calculating the phase error associated with leakage for a phase advance representing the cumulative phase error associated with each signal sample.

6. The method as recited in claim 1, wherein no more than five false tone detections are found in the signal during a thirty minute sampling period.

7. The method as recited in claim 1, wherein the method further comprises the step of satisfying the ITU recommendations exactly for signal frequencies, frequency tolerance, signal duration, signal exception, twist, and signal strength.

8. The method as recited in claim 1, wherein the preset threshold value is within at least one of 70% of a peak energy level and 3 dB of a system energy peak, said system energy peak being dictated by the construction of the system.

9. The method as recited in claim 1, wherein the phase correction component for the m-th block of N samples is equivalent to $e^{2\pi m \Delta k}$, where $\Delta k$ represents the positive remainder of a DFT index integer k for a given DFT length N value at a given sampling frequency.

10. The method as recited in claim 9, wherein the DFT length, N, represents the resolution of the modified DFT and is greater than 205 when sampling DTMF signals at 8000 Hz.

* * * * *

UNITED STATES PATENT AND TRADEMARK OFFICE
CERTIFICATE OF CORRECTION

PATENT NO.   : 6,560,331 B1
DATED        : May 6, 2003
INVENTOR(S)  : Todor Cooklev and Mark Gray It is certified that error appears in the above-identified patent and that said Letters Patent is hereby corrected as shown below:

Title page,
Item [57], ABSTRACT,
Line 18, before "number" delete the comma

Column 2,
Line 43, after "channel, these" change "function" to -- functions --
Line 52, before "of the human" change "spectrumn" to -- spectrum --

Column 5,
Line 44, before "signal" change "an" to -- a --

Column 6,
Line 25, before "above," change "describe" to -- described --

Column 7,
Line 4, before "signal" change "an" to -- a --
Line 8, before "tones" change "fumndamental" to -- fundamental --
Line 12, after "validated" insert comma
Line 12, after "module" delete the comma
Line 57, after "due" change "the" to -- to --

Column 9,
Line 23, equation 15, change "$X_{n,m}(f)=\{X_{n-1,m}(f)+[x(n)-x(n-N)e^{-jN\theta_1}]e^{-j\theta_2}\}e^{jj\theta_1}$" to -- $X_{n,m}(f)=\{X_{n-1,m}(f)+[x(n)-x(n-N)e^{-jN\theta_1}]e^{-j\theta2}\}e^{j\theta_1}$ --
Line 52, change "$f_f$" to -- $f_k$ --

UNITED STATES PATENT AND TRADEMARK OFFICE
CERTIFICATE OF CORRECTION

PATENT NO.    : 6,560,331 B1
DATED         : May 6, 2003
INVENTOR(S)   : Todor Cooklev and Mark Gray It is certified that error appears in the above-identified patent and that said Letters Patent is hereby corrected as shown below:

Column 11,
Line 51, after "decodes" change "he" to -- the --

Signed and Sealed this

Twenty-sixth Day of August, 2003

JAMES E. ROGAN
*Director of the United States Patent and Trademark Office*